United States Patent
Kondo

[15] 3,653,312
[45] Apr. 4, 1972

[54] FILM WINDING DEVICE FOR SINGLE-LENS REFLEX CAMERA

[72] Inventor: Hidenobu Kondo, Kawasaki, Japan
[73] Assignee: Nippon Kogaku K.K., Tokyo, Japan
[22] Filed: Nov. 24, 1970
[21] Appl. No.: 92,419

[30] Foreign Application Priority Data
Nov. 27, 1969 Japan..................44/112101

[52] U.S. Cl..................................................95/42
[51] Int. Cl..............................................G03b 19/12
[58] Field of Search..........................95/42; 355/51

[56] References Cited

UNITED STATES PATENTS

| | | | |
|---|---|---|---|
| 3,165,992 | 1/1965 | Ando | 95/42 |
| 3,304,848 | 2/1967 | Steisslinger et al. | 95/42 |
| 3,319,551 | 5/1967 | Ettischer et al. | 95/42 |
| 3,427,945 | 2/1969 | Ettischer et al. | 95/42 |
| 3,468,232 | 9/1969 | Knapp | 95/42 |
| 3,474,715 | 10/1969 | Nakamura | 95/42 |

*Primary Examiner*—Samuel S. Matthews
*Assistant Examiner*—Richard A. Wintercorn
*Attorney*—Harry G. Shapiro

[57] ABSTRACT

A film winding device for a single-lens reflex camera which eliminates the necessity of effecting preliminary ineffective exposure operations, that is, so called "blank" exposures after the film loading by the use of a simple mechanism utilizing various parts employed in the conventional camera and only requiring a few additional parts.

1 Claims, 2 Drawing Figures

Patented April 4, 1972

INVENTOR.
HIDENOBU KONDO

BY Harry S. Shapiro

ATTORNEY

Patented April 4, 1972

INVENTOR.
HIDENOBU KONDO
BY Harry G. Shapiro
ATTORNEY

FILM WINDING DEVICE FOR SINGLE-LENS REFLEX CAMERA

BACKGROUND OF THE INVENTION

1. Field of the Invention

This invention relates to a film winding device for a single-lens reflex camera, and particularly to a film winding device for the camera having an interconnected film feed and shutter setting mechanism.

2. Description of the Prior Art

According to the prior art cameras, it has been necessary to effect at least two or three "blank" exposures, after a roll of film has been loaded, and accordingly the shutter button must be depressed each time the film is wound up for such ineffective exposure. Repetition of such preliminary wind-up process is often cumbersome to the user of camera.

SUMMARY OF THE INVENTION

It is therefore the main object of the present invention to provide a film winding device which enables a continuous wind-up operation to be carried out until the film counter displays the division "1" without the necessity of depressing the shutter button, and thereafter any further wind-up operation cannot be carried out unless a shutter operation is completed.

To achieve such an object, the film winding device of the present invention comprises a wind-up limiting cam secured to a wind-up shaft, a wind-up limiting lever engageable with said wind-up limiting cam, a slide plate for engaging and disengaging said wind-up limiting lever with said wind-up limiting cam, a slide plate charge lever for actuating said slide plate to retain said wind-up limiting cam in response to a wind-up operation, a key lever for retaining said slide plate charge lever in wind-up position, a mirror lowering lever operable in response to the wind-up operation and adapted to release the retention of said key lever in response to return of the wind-up operation, a retainer lever for retaining said mirror lowering lever in wind-up position, a major release lever adapted to release the retention of said retainer lever in response to completion of shutter operation, a projection cam integral with an automatic return film counter, a release lever for returning said automatic return film counter in response to opening or closing of a back cover of the camera, and a control lever associated with said release lever for a actuating said major release lever and having a portion thereof engaged with said projection cam, said projection cam having a projection formed thereon for stopping the return motion of said control lever when said automatic return film counter has returned to its operating position.

The invention will now be described in greater detail with respect to an embodiment thereof shown in the accompanying drawings.

DESCRIPTION OF THE PREFERRED EMBODIMENT

Figure 1:
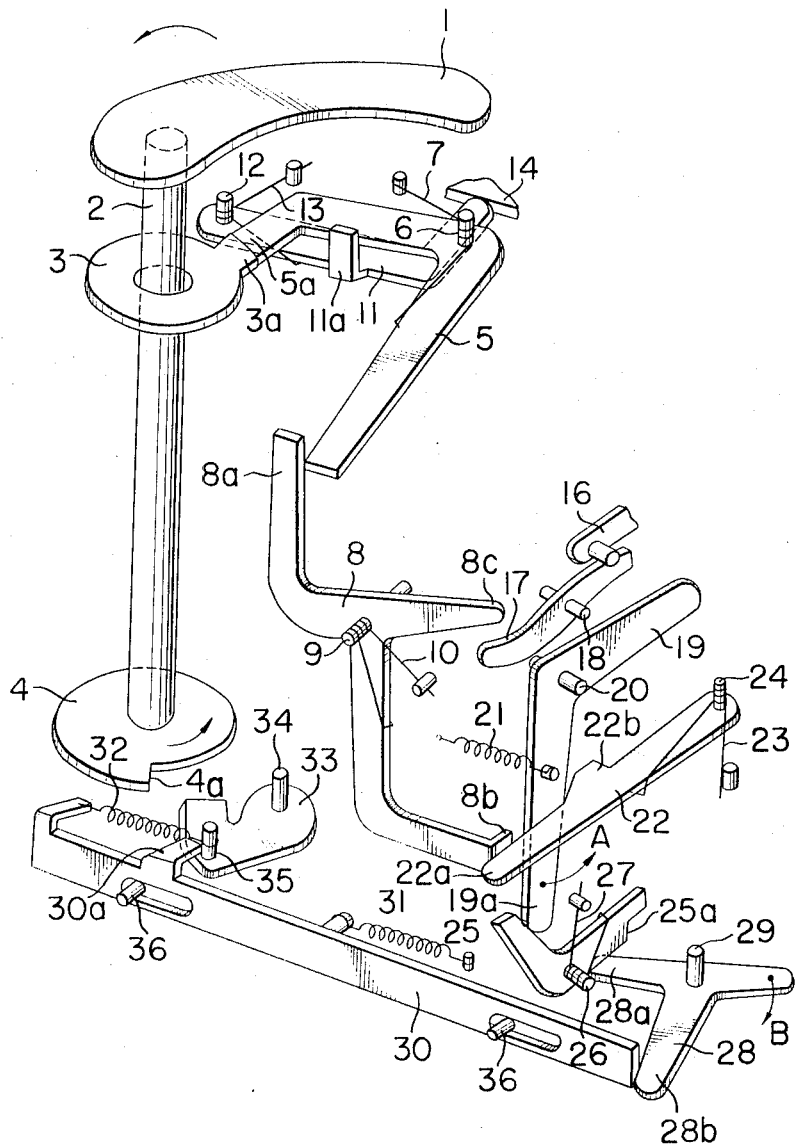
FIG. 1 is a perspective view of the film winding device according to the present invention and showing the device in a position where the film counter indicates "0" just after the back cover of the camera has been closed upon loading of a film roll.

Referring to FIG. 1, a wind-up lever 1 is secured to a wind-up shaft 2 at the top thereof, and a projection cam having a projection 3a is also mounted on the wind-up shaft 2 below the wind-up lever 1. The projection cam 3 is movable with a known automatic return film counter (not shown). A wind-up limiting cam 4 having a cut-away or shoulder 4a is secured to the wind-up shaft 2 at the lower end thereof. A control lever 5 is pivotally mounted on a pin 6 so that one end 5a of the lever 5 is brought into abutting engagement with the projection 3a of the projection cam 3 when a film is wound up until the film counter (not shown) display the number "1." The control lever 5 is urged counter-clockwise by a spring 7. The other end portion of the control lever 5 forms an arm which is in engagement with the upper arm 8a of a major release lever 8, which also has lower and intermediate arms 8b and 8c. The major release lever 8 of substantially T-shaped is pivotally mounted on a pin 9 and urged clockwise by a spring 10. The intermediate arm 8c of the major release lever 8 is adapted to engage with a release lever 17 to be described, while the lower arm 8b is in engagement with a retainer lever 22 also to be described. A release lever 11 having a projection 11a formed intermediately thereof is pivotally mounted on a pin 12 and urged counter-clockwise by a spring 13. The release lever 11 is movable in response to opening and closing of the back cover of the camera (partly indicated at 14) and is also capable of releasing the film counter at the same time. The projection 11a of the release lever 11 is engageable with the control lever 5. Thus, the counter-clockwise urge of the spring 13, via the control lever 5 urged counter-clockwise by the spring 7, causes counter-clockwise rotation of the major release lever 8 urged clockwise by the spring 10.

A signal lever 16 associated with an unshown shutter is designed to rotate clockwise a release lever 17 pivotally mounted on a pin 18, after a shutter operation. A mirror lowering lever 19 forming a part of an unshown mirror mechanism is forced to rotate counter-clockwise, as shown by arrow A in FIG. 1, in response to the actuation of the wind-up mechanism, and returned by a return spring 21 to thereby lower a mirror (not shown). When returned by the return spring 21, the mirror lowering lever 19 is adapted to rotate a key lever 25 counter-clockwise as will be described. A retainer lever 22 has an end 22a engaged with the lower arm 8b of the major release lever 8 and a retainer pawl 22b for retaining the mirror lowering lever 19, and it is pivotally adapted to a pin 24 and urged counter-clockwise by a spring 23 provided thereon. A key lever 25 having a key portion 25a formed cut-away at one end thereof is pivotally mounted on a pin 26 and urged clockwise by a spring 27. The key portion 25a of the key lever 25 is engageable with a slide plate charge lever 28 at one end 28a thereof, and the other end of the key lever 25 is engageable with the lower end 19a of the mirror lowering lever 19. The slide plate charge lever 28 is T-shaped and mounted for rotation about a pin 29. The intermediate end 28b of the charge lever 28 is engageable with a slotted slide plate 30, which is connected to the camera body by means of a tension spring 31. Another tension spring 32 connects the slide plate 30 to a wind-up limiting lever 33 pivotally mounted on a pin 34. The wind-up limiting lever 33 has a pin 35 studded therein which is engageable with a projection 30a formed in the slide plate 30. Thus, the slide plate 30 can be moved with the aid of cooperation between the slots therein and guide pins 36 received in the respective slots.

Figure 2:
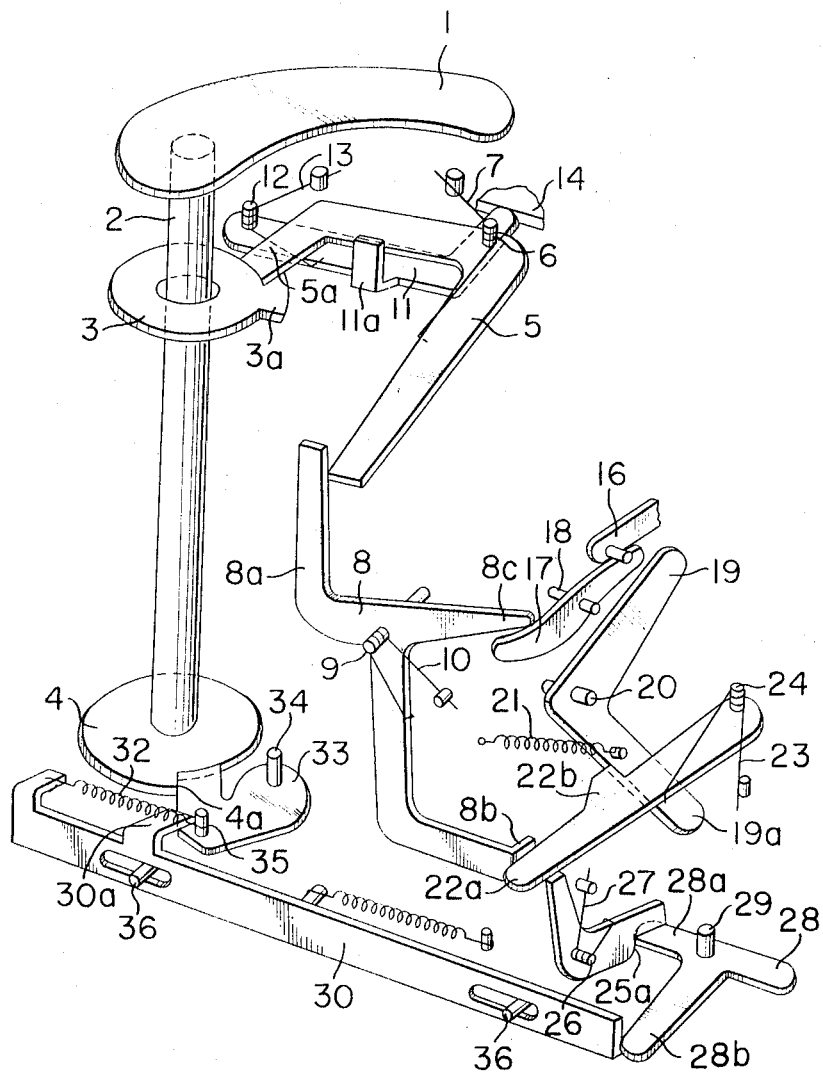
FIG. 2 is a view similar to FIG. 1 but showing the device in another state where the film counter displays "1" after a preparatory film winding operation has been effected.

With the described arrangement of FIG. 1, if the wind-up lever 1 is rotated for wind-up of film in the direction as indicated by the arrow, the mirror lowering lever 19 will be forced to rotate in the direction of arrow A by an unshown mechanism while the slide plate charge lever 28 will be forced to rotation in the direction of arrow B. Such rotation of the slide plate charge lever 28 causes the slide plate 30 to move leftwardly from the position shown in FIG. 1, to thereby tension the springs 31 and 32, of which the latter spring 32 in turn urges the wind-up limiting lever 33 in the clockwise direction so that the lever 33 is positioned as shown in FIG. 2, where the wind-up limiting lever 33 is received into the cut-away 4a of the wind-up limiting cam 4 to prevent any further wind-up operation upon return of the wind-up lever 1 to its initial position. Such position of the wind-up limiting lever 33 is maintained as long as the end 28a of the slide plate charge lever 28 is being retained by the key portion 25a of the key lever 25.

In FIG. 2, when the back cover 14 is opened, the release lever 11 is rotated counter-clockwise by the urge of the spring 13 so that the control lever 5 is pushed by the projection 11a of the release lever 11. This causes the control lever 5 to rotate clockwise against the action of the spring 7 acting on the lever 5 and the action of the return spring 10 acting on the major release lever 8, which is thus rotated counter-clockwise.

The end 5a of the control lever 5 is maintained in the counter-clockwise rotated position as shown in FIG. 1 by the projection 3a of the cam 3 which has rotated to the position in FIG. 1 with the return of the film counter. Therefore, the release lever 11 will be returned to its position of FIG. 1 by closing the back cover, whereas the abutting engagement between the projection 3a and the end 5a of the control lever 5 prevents further rotation of the control lever 5 and maintains it in the position as shown in FIG. 1, in spite of the clockwise urge of the spring 10 acting on the major release lever 8. When the major release lever 8 has been rotated counter-clockwise as described previously, the lower arm 8b thereof pushes the corresponding end 22a of the retainer lever 22, which is thereby rotated counter-clockwise or rightwardly with its retainer pawl 22b retracted also rightwardly. The mirror lowering lever 19, which has been rotated in the direction of arrow A to take the position of FIG. 2 by that time, is allowed to return to its position shown in FIG. 1 by the action of the spring 21 upon return of the wind-up lever 1 to its original position, without being retained by the retainer pawl 22b. As the result, the key lever 25 is rotated counter-clockwise by the lower end 19a of the mirror lowering lever 19, thus releasing its engagement with the slide plate charge lever 28.

Upon disengagement between the key portion 25a of the key lever 25 and the end 28a of the slide plate charge lever 28, the slide plate 30 is allowed to return rightwardly by the action of the spring 31. Thereupon, the pin 35 on the wind-up limiting lever 33 is pushed by the projection 30a of the slide plate 30 so that the wind-up limiting lever 33 is retracted from the cut-away 4a of the wind-up limiting cam 4 to return to a position for allowing the free rotation of the wind-up lever 1. This means that continuous operation for film wind-up can be effected with the major release lever 8 maintained at its counter-clockwise rotated position.

As the film wind-up operation is effected with the backcover closed, the film counter is advanced in the known manner and the projection cam 3 is rotated therewith to the position shown in FIG. 2 where the projection 3a is out of abutting engagement with the end 5a of the control lever 5, which is thus rotated counter-clockwise and accordingly the major release lever 8 is rotated clockwise to allow the retainer lever 22 to rotate leftwardly or clockwise. Thus, the retainer pawl 22b of the retainer lever 22 is allowed to engage with and retain the mirror lowering lever 19.

Therefore, when the next wind-up operation is carried out, the mirror lowering lever 19 is rotated in the direction of arrow A as described above, until it goes past the retainer pawl 22b so as to be retained thereby and maintained at such position. At the same time, the slide plate charge lever 28 is rotated in the direction of arrow B as described, until it is retained by the key portion 25a of the key lever 25, whereby the wind-up limiting lever 33 is maintained at a position for preventing wind-up operation and thus any continued wind-up operation cannot be effected. When the shutter button (not shown) is depressed for shutter operation, the shutter signal causes the release lever 17 to be rotated to raise the arm 8c of the major release lever 8, whereby the retainer lever 22 is rotated rightwardly or counter-clockwise to release its engagement with the mirror lowering lever 19, which is thus allowed to return to its initial position and accordingly the key lever 25, the slide plate charge lever 28 and slide plate 30 are moved in the described manner. Thus, the wind-up limiting lever 33 again takes its position for allowing the wind-up operation and another wind-up can now be taken place.

It will thus be seen that continuous wind-up operation corresponding to a predetermined length of the film is permitted by the projected cam 3 without operating the shutter, whereafter any further wind-up is not permitted without releasing the shutter.

According to the present invention, as described above, the film wind-up operation can be effected continuously without the need to depress the shutter button for the preliminary "-blank" exposure operation after the film loading, and this means a great convenience which could never be had in the prior art. Moreover, the device according to the present invention can utilize the various levers and other parts which are being employed in usual cameras and only requires a few additional parts to achieve its intended purpose with great economical advantages.

What is claimed is:

1. A film winding device for a single-lens camera requiring no preliminary "blank" exposure operations, comprising a wind-up limiting cam secured to a wind-up shaft, a wind-up limiting lever engageable with said wind-up limiting cam, a slide plate for engaging and disengaging said wind-up limiting lever with said wind-up limiting cam, a slide plate charge lever for actuating said slide plate to retain said wind-up limiting cam in response to a wind-up operation, a key lever for retaining said slide plate charge lever in wind-up position, a mirror lowering lever operable in response to the wind-up operation and adapted to release the retention of said key lever in response to return of the wind-up operation, a retainer lever for retaining said mirror lowering lever in wind-up position, a major release lever adapted to release the retention of said retainer lever in response to completion of shutter operation, a projection cam integral with an automatic return film counter, a release lever for returning said automatic return film counter in response to opening or closing of a back cover of the camera, and a control lever associated with said release lever for actuating said major release lever and having a portion thereof engaged with said projection cam, said projection cam having a projection formed thereon for stopping the return motion of said control lever when said automatic return film counter has returned to its operating position.

* * * * *